Jan. 17, 1967  F. W. HOLLAND  3,298,812
MOLD WITH VACUUM TRANSFER APPARATUS
Filed June 27, 1963  2 Sheets-Sheet 2
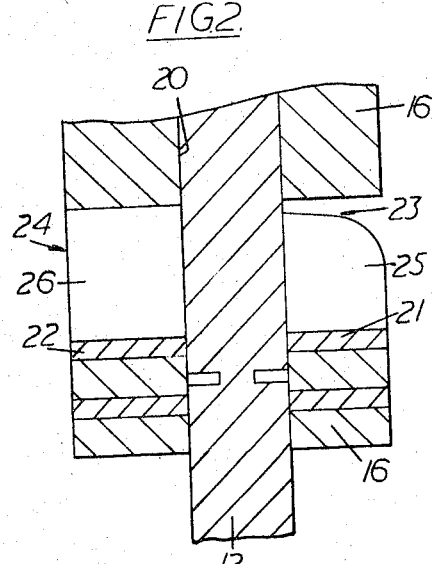
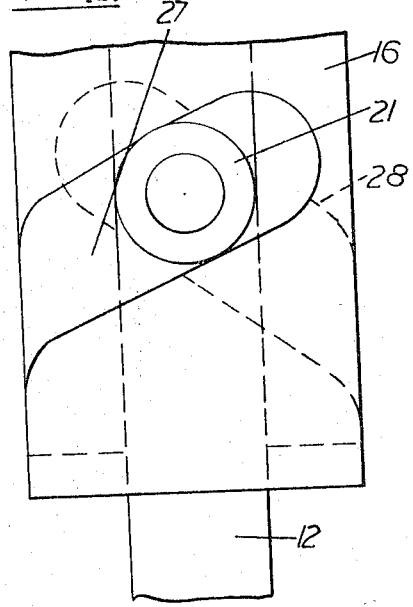
Inventor

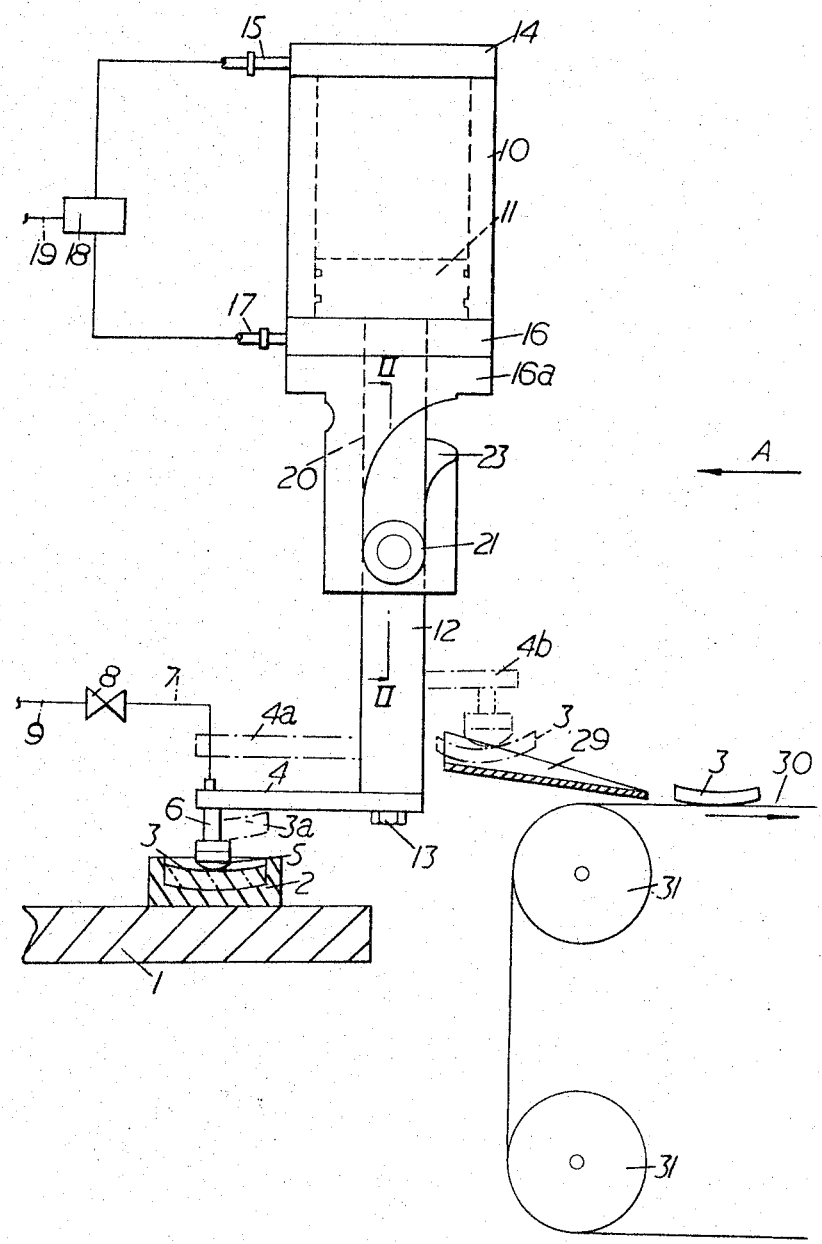

United States Patent Office 3,298,812
Patented Jan. 17, 1967

3,298,812
MOLD WITH VACUUM TRANSFER APPARATUS
Francis William Holland, St. Asaph, Flintshire, Wales, assignor to Pilkington Brothers Limited, Liverpool, England, a corporation of Great Britain
Filed June 27, 1963, Ser. No. 291,164
Claims priority, application Great Britain, July 24, 1962, 28,467/62
4 Claims. (Cl. 65—260)

This invention relates to moulding apparatus and in particular to apparatus for removing moulded articles from successively presented moulds mounted on a rotatable table of a moulding machine.

In the usual kind of moulding machine, for example a machine for moulding glass articles such as lens blanks, a plurality of moulds are equispaced around a mould table which is rotatable through a number of stations. Each mould receives a charge of mouldable material in turn at one station and at subsequent stations moulding pressure is applied to the mould material to shape the charge in the mould.

In the moulding of glass articles, after the article has been moulded its mould passes through further stations during which time it cools until the article is sufficiently stiff to be undamaged by any mechanical handling. The mould is then presented to a station at which the moulded articles are removed from the moulds in turn and placed on a conveyor.

In the moulding of lens blanks or other glass articles, for example, the stiffened articles are lifted from the moulds and placed on a conveyor which takes the articles into an annealing lehr.

Usually a vacuum pad is employed to lift the moulded articles from the moulds and this pad descends as each mould is presented, to contact the upper surface of the moulded article. Suction is then applied to the vacuum pad so that it grips the upper surface of the article and the vacuum pad is then retracted to take the article out of the mould. The movement of the vacuum pad has been a movement on a curved path so that the gripped article is lifted from the mould on a curved path and there has been a tendency for the moulded article to catch on the side of the mould as it is taken out so that the article is damaged. In the moulding of glass articles such damage has resulted in an undesirable proportion of rejects. In particular in the moulding of glass lens blanks when the blanks are for lenses of high power and have a corresponding deep curvature there has been a tendency for the edges of the blanks to be chipped as they are taken out of the moulds.

It is a main object of the present invention to provide an improved apparatus for removing moulded articles from successively presented moulds by eliminating the tendency for the articles to be damaged by striking the edge of the mould as they are lifted out of the mould.

According to the invention apparatus for removing moulded articles from successively presented moulds mounted on a rotatable table of a moulding machine, comprises an arm carrying at one end means for gripping a moulded article, the other end of the arm being connected to driving means for moving the arm towards and away from a mould on the table, and cam means for guiding the movement of the arm so that the gripping means moves into and out of the mould axially of the mould to grip a moulded article and to extract the article from the mould, and so that the arm pivots away from the mould after the article has been completely extracted from the mould.

Further according to the invention apparatus for removing moulded articles from successively presented moulds mounted on a rotatable table of a moulding machine comprises an arm for mounting above the table and carrying at one end means for gripping a moulded article, driving means connected to the other end of the arm for moving the arm towards and away from a mould on the table, and cam means for guiding said movement of the arm so that the gripping means moves into and out of the mould axially of the mould to grip a moulded article and remove the article from the mould, and the arm pivots away from the table after the article has been completely extracted from the mould.

Because of the axial movement of the gripping means as a moulded article is lifted out of the mould, which axial movement continues until the article is well clear of the mould, there is no tendency for the article to be damaged by striking the edge of the mould as the gripping means carries the article away from the mould.

Further, according to the invention the driving means comprises a cylinder adapted to be fixed relative to the table, a piston slidable in the cylinder and including a piston rod connected to one end of the arm, and means for selectively supplying fluid under pressure to both ends of the cylinder to move the piston to and fro in the cylinder.

Preferably the cam means includes at least one cam roller mounted on the piston rod and a co-operating cam surface arranged to guide said roller so that the piston rod rotates to pivot said arm after the gripping means has been withdrawn from the mould through a predetermined distance sufficient to extract completely a gripped moulded article from the mould.

In a preferred embodiment of the invention the cylinder includes a base block and a track block fixed to the base block said blocks being formed with a central bore through which the piston rod extends, the wall of the bore is shaped with a cam channel in which a roller on the piston rod engages, and the cam channel has a lower portion extending axially of the bore and leading to an upper portion curving helically around the bore, so that retraction of the piston in the cylinder causes an upward displacement of the arm through a predetermined distance followed by a pivoting of the arm about the axis of the piston rod as the retraction of the piston is completed.

Preferably there are two cam rollers oppositely disposed on either side of the piston rod, and two co-operating channels formed in the bore of the track block with oppositely disposed lower axial portions and helical upper portions extending in the same direction around the bore.

Further according to the invention the gripping means is a vacuum pad adapted to grip the upper surface of a moulded article, and the apparatus further includes control means for the vacuum pad operable to apply suction to the pad when it contacts an article and to release the suction when the gripped article has been carried away from the table by pivoting of the arm.

The invention also comprehends a moulding machine comprising a rotatable table carrying a number of moulds equispaced around the table, means for rotating the table stepwise through a number of stations on the moulding machine, and above the table at one of said stations apparatus of the kind described above for extracting moulded articles from the successively presented moulds.

In order that the invention may be more clearly understood an embodiment thereof will now be described, by way of example, with reference to the accompanying diagrammatic drawings in which:

FIGURE 1 is an elevation of apparatus according to the invention for removing moulded articles from successively presented moulds, shown in section, mounted on a rotatable table of a moulding machine and for depositing the articles on a conveyor.

FIGURE 2 is a section on line II—II of FIGURE 1, and

FIGURE 3 is a detail elevation as seen in the direction of arrow A in FIGURE 1.

Referring to the drawings, a rotatable table of a moulding machine is indicated at 1 and a plurality of moulds 2 are mounted on the top of the table and are equispaced around the table. The mould 2 shown in the drawing is a mould for moulding a glass lens blank.

The table 1 rotates stepwise through a succession of stations in one of which the mould 2 receives a charge of molten glass. At a following station a mould ring descends on to the mould 2 and a mould plunger is then pressed down through the mould ring to apply moulding pressure to the charge of molten glass. The mould ring and plunger are withdrawn after the moulded lens blank 3 has stiffened sufficiently to hold its shape, and the table rotates to a take-out station at which the lens blank 3 has stiffened sufficiently to be gripped by mechanical means and lifted out of the mould 2.

Apparatus for removing the moulded articles 3 from the moulds 2 which are successively presented at the take-out station comprises an arm 4 mounted above the table 1 and carrying at one end a vacuum pad 5 for gripping a moulded article. The vacuum pad 5 is mounted on an extension 6 fixed to the arm 4 and a suction pipe 7 connected to the pad 5 is also connected through a valve 8 to a main suction line indicated at 9.

The other end of the arm 4 is connected to driving means for moving the arm towards and away from the mould 2 on the table and the driving means comprises a cylinder 10 which is fixed above the side edge of the table 1, and a piston 11 slidable in the cylinder 10. The piston 11 is mounted on one end of a piston rod 12 and the other end of the piston rod 12 is connected to the arm 4 by a bolt 13.

The top of the cylinder 10 is closed by a block 14 which includes a port connected to a fluid supply pipe 15 through which fluid under pressure is supplied to the top of the cylinder 10. The bottom of the cylinder 10 is closed by a base block 16 including a port connected to a second fluid supply pipe 17 through which fluid under pressure is supplied to the bottom of the cylinder 10. The pipes 15 and 17 are connected to a valve 18 which has an inlet from a supply line 19 which supplies fluid under pressure to the valve. The valve 18 permits exhaust from the cylinder through the pipe 15 or 17 which is not under pressure.

A track block 16a is fixed to the base block 16, and a central bore 20 is formed through the base block 16 and track block 16a. The piston rod 12 extends through the bore 20 and cam means are provided to guide the movement of the arm 4 so that the vacuum pad gripping means 5 moves into the mould 2 axially of the mould to grip the article 3, and then the arm pivots away from the table 1 after the article has been completely extracted from the mould 2. The cam means includes two cam rollers 21 and 22 oppositely mounted on either side of the piston rod 12, and two co-operating cam channels 23 and 24 formed the track block 16a. Each of the cam channels 23 and 24 has a lower axial portion, respectively 25 and 26, FIGURE 2, and an upper helical portion extending around the track block 16a. The helical portions 27 and 28 of the cam channels 23 and 24 are shown in FIGURE 3. The helical portions 27 and 28 of the two cam channels 23 and 24 extend in the same direction around the bore 20 of the track block 16a.

The operation of the apparatus will now be described beginning from the lowermost position of the piston 11, as shown in FIGURE 1, in which position the vacuum pad 5 engages the top surface of the lens blank 3. Suction is applied to the vacuum pad 5 through the valve 8 and the line 7, so that the moulded blank 3 is gripped by the vacuum pad. The valve 18 is then operated to supply fluid under pressure through line 17 to the bottom of the cylinder 10, so that the piston 11 is retracted in the cylinder 10 and the initial upward movement of the arm 4 is controlled by the axial cam channel portions 25 and 26 so that the arm 4 moves upwardly axially of the mould 2 to the position indicated at 4a in FIGURE 1, the lens blank then being in the position indicated at 3a, in which the lens blank is extracted completely from the mould. That is the moulded blank 3 is well clear of the mould 2 before the rollers 21 and 22 begin to move into the curved helical portions of the cam channels.

As the piston 11 continues to rise in the cylinder 10, the co-operation of the rollers 21 and 22 with the helical upper cam channel portions 27 and 28 causes the arm 4 to rise and pivot about the axis of the piston rod 12 from the position 4a to its uppermost position 4b when the rollers 21 and 22 are at the upper ends of the cam channels 23 and 24. The lens blank 3 carried by the vacuum pad 5 is thus pivoted up and away from the table 1, and when the arm 4 is in the position 4b the valve 8 is operated to release the suction so that the blank 3 drops a short distance into a chute 29 which deposits the blank on a conveyor belt 30 supported on driven rollers 31. The belt 30 carries the moulded glass blanks, which are still hot, into an annealing lehr, not shown.

By the provisions of the cam means just described for guiding the movement of the vacuum pad so that it moves initially axially of the mould, the moulded blank 3 is extracted completely from the mould before there is any pivoting movement of the arm 4, and as the blank is then well clear of the mould there is no danger of the blank being chipped by striking the edge of the mould as the arm 4 pivots away from the table to its final position 4b.

There is thus provided a take-out apparatus for use with a rotary moulding machine in which the number of moving parts are reduced to a minimum so that the weight of the moving parts is small and, apart from the advantage of avoiding rejects because of chipping when the blanks are lifted out of the mould, the take-out apparatus works faster than previous take-out units, so that the speed of operation of the rotary moulding machine can be increased. Further, because the number of moving parts is so small the take-out units are easy to service, thus avoiding a disadvantage of the commonly used take-out arrangements, which were usually so complicated that it was necessary to dismantle parts of the moulding machine in order to service the take-out unit.

The cam channels 23 and 24 may be shaped to give any desired vertical movement and swing of the vacuum pad carrying the moulded blank, and the length of the arm 4 can be varied to determine the arc, through which the vacuum pad 5 swings before depositing the blank 3 which it grips.

The invention also comprehends a take-out apparatus in which the arm 4 is attached to the bottom of a cylinder which slides on a fixed position, but it is preferred to employ a fixed cylinder with a movable piston, as described herein.

I claim:

1. Apparatus for removing moulded articles from successively presented moulds fixed to the top surface of a rotatable table of a moulding machine, each mould having a mould cavity open at the top, comprising an arm for mounting above the table, a vacuum pad carried at one end of the arm which pad is shaped so that it can enter the mould and engage the upper surface of a moulded article in the mould, control means for the vacuum pad operable to apply suction to the pad, driving means connected to the other end of the arm and operable to move the arm towards and away from the table top, said driving means including a cam track having a first portion parallel to the axis of the mould and so positioned relative to the mould that the guided movement of the arm moves the vacuum pad from a position well clear of the mould into and out of the mould to lift a gripped moulded article well clear of the mould, said cam track having a second portion helically curved from the first portion to pivot the arm away from the mould on further operation of the driving means after the article has been completely extracted from the mould.

2. Apparatus according to claim 1, wherein the driving means comprises a cylinder adapted to be fixed relative to the table, a piston slidable in the cylinder and including a piston rod connected to one end of the arm, and means for selectively supplying fluid under pressure to both ends of the cylinder to move the piston to and fro in the cylinder, and the cam means includes at least one cam roller mounted on the piston rod and co-operating with said cam track.

3. Apparatus according to claim 2, wherein the cylinder includes a base block and a track block fixed to the base block, said blocks being formed with a central bore through which the piston rod extends, the wall of the bore is shaped with said cam track formed as a channel in which a roller on the piston rod engages, the cam channel having a lower portion extending axially of the bore and leading to an upper portion curving helically around the bore.

4. Apparatus according to claim 3, including two cam rollers oppositely disposed on either side of the piston rod, and two co-operating channels formed in the bore of the track block with oppositely disposed lower axial portions and helical upper portions extending in the same direction around the bore.

References Cited by the Examiner

UNITED STATES PATENTS

| | | | |
|---|---|---|---|
| 1,869,920 | 8/1932 | Soubier | 65—260 |
| 3,195,996 | 7/1965 | Tingley | 65—260 X |

FOREIGN PATENTS

| | | |
|---|---|---|
| 1,291,067 | 3/1962 | France. |

DONALL H. SYLVESTER, *Primary Examiner.*

A. D. KELLOGG, *Assistant Examiner.*